Figure 1:
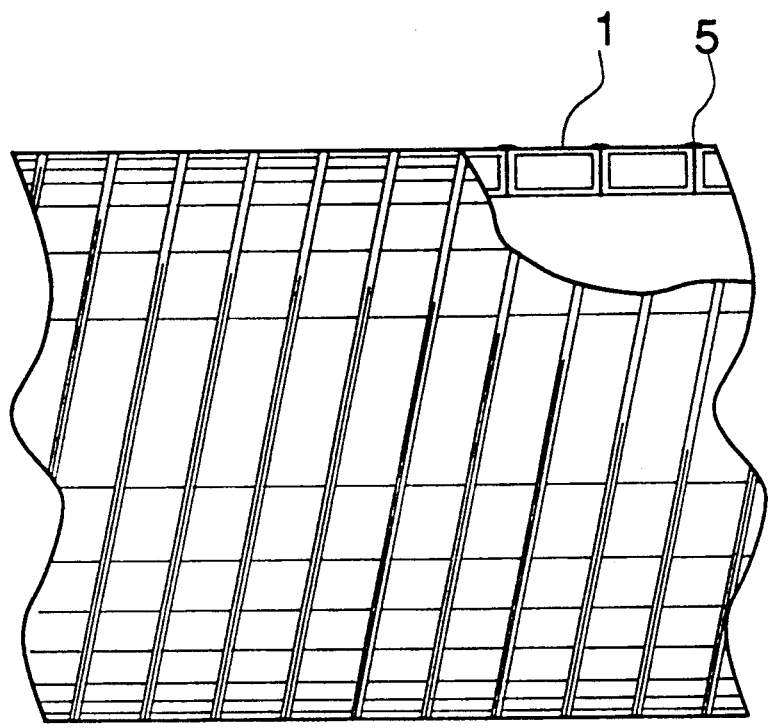

United States Patent [19]

Blomqvist

[11] Patent Number: 5,127,442
[45] Date of Patent: Jul. 7, 1992

[54] PLASTIC TUBE FORMED BY SPIRAL WINDING OF HOLLOW SECTION

[75] Inventor: Gunnar Blomqvist, Helsingby, Finland

[73] Assignee: Oy KWH Pipe Ab, Vasa, Finland

[21] Appl. No.: 651,230

[22] PCT Filed: Aug. 16, 1989

[86] PCT No.: PCT/FI89/00151
§ 371 Date: Feb. 7, 1991
§ 102(e) Date: Feb. 7, 1991

[87] PCT Pub. No.: WO90/02285
PCT Pub. Date: Mar. 8, 1990

[30] Foreign Application Priority Data

Aug. 17, 1988 [FI] Finland ................................. 883806

[51] Int. Cl.⁵ .............................................. F16L 9/16
[52] U.S. Cl. ....................................... 138/154; 138/129;
138/111; 138/115; 138/148
[58] Field of Search ............... 138/111, 113, 114, 115,
138/129, 153, 154, 148, 144, 150

[56] References Cited

U.S. PATENT DOCUMENTS

| | | | |
|---|---|---|---|
| 2,874,722 | 2/1959 | Hamblin | 138/144 |
| 3,273,600 | 9/1966 | Swan | 138/154 |
| 3,495,628 | 2/1970 | Boender | 138/154 |
| 3,679,531 | 7/1972 | Wienand et al. | 138/154 |
| 3,811,478 | 5/1974 | Ahlqvist | 138/129 |
| 3,926,223 | 12/1975 | Petzetakis | 138/144 |
| 4,301,200 | 11/1981 | Langenfeld et al. | 138/154 |
| 4,304,268 | 12/1981 | Gilman | 138/154 |
| 4,531,551 | 7/1985 | Eichelberger et al. | 138/154 |
| 4,657,049 | 4/1987 | Fourty et al. | 138/154 |
| 5,007,462 | 4/1991 | Kanao | 138/154 |

*Primary Examiner*—James E. Bryant, III
*Attorney, Agent, or Firm*—McGlew & Tuttle

[57] ABSTRACT

A spiral-wound tube formed of a hollow section 1 is provided wherein the hollow section is joined together by extruder welding or gluing. The hollow section is coextruded and comprises an outer layer (2) of pastic with a homogenous surface and good weldability. An intermediate layer 3 is provided of a modified polymer and an inner layer (4) is also provided. The interior space defined by the tubular layers (2, 3, 4) is preferably rectangular in cross-section.

7 Claims, 1 Drawing Sheet

PLASTIC TUBE FORMED BY SPIRAL WINDING OF HOLLOW SECTION

FIELD OF THE INVENTION

The present invention concerns a spiral-wound tube made of a hollow section joined together by extruder welding or gluing.

BACKGROUND OF THE INVENTION

In an attempt to manufacture tubes of maximum strength and permanence of shape with a certain consumption of material, spiral-wound tubes made of a hollow section have been achieved, said section being joined together preferably by extruder welding, but possibly also by means of gluing.

SUMMARY AND OBJECTS OF THE INVENTION

The object of the present invention is to lower the cost of manufacture further as well as to provide spiral-wound tubes with particular properties on the different faces of the tube.

This is achieved by means of a spiral-wound tube which is characterized in that the hollow section is coextruded and comprises an outer layer of a plastic with a homogeneous surface and with good weldability, as well as at least one inner layer of modified polymer.

According to the invention, the tube which is to be spirally wound, is formed with a layered tubular structure having an outer tubular layer of plastic with a homogenous surface and an inner tubular layer of plastic with a homogenous surface and an intermediate layer, between the outer layer and the inner layer wherein the intermediate layer is also tubular and is preferably formed of a modified polymer. The outer layer preferably consists of a UV-stabilized polyethylene, polypropylene, polyvinylchloride, or polycarbonate. The tubular portions define a hollow interior section which is preferably substantially rectangular in cross-section. The tubular outer layer has a sidewall which forms an inner face of the spiral-wound tube and preferably consists of a polymer resistant to chemicals. The modified polymer which forms the intermediate layer is preferably foamed. This modified polymer may also be formed as polymer filled with minerals.

Figure 2:
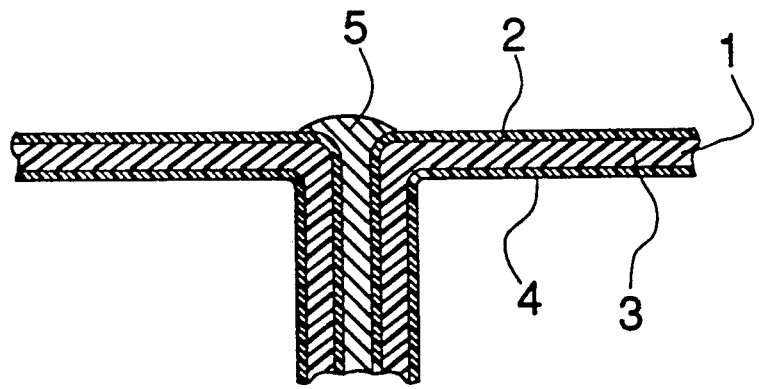

In the following, the invention will be described in more detail with reference to the accompanying drawing, wherein FIG. 1 is a partly sectional side view of an exemplifying embodiment of a spiral-wound tube in accordance with the invention, and FIG. 2 shows an enlarged detail of a weld joint in the tube shown in FIG. 1.

The spiral-wound tube in accordance with the invention comprises a spiral-wound hollow section 1, whose side walls in the adjoining layers in the spiral winding are joined together preferably by extruder welding, but alternatively possibly by gluing. In view of minimizing the material cost while, at the same time, retaining or improving the properties of the finished tube, according to the invention, a coextruded hollow section 1, is used, which comprises an outer layer 2 of a plastic with a homogeneous surface and good weldability as well as at least one inner layer 3 of a modified polymer.

If the starting point is a hollow section 1 which, besides the homogeneous outer layer 2, also comprises an intermediate layer 3 of modified polymer and an inner layer 4 of a plastic with a homogeneous surface, a tube with very good properties is obtained.

When the modified polymer consists of a foamed polyethylene, polypropylene, or equivalent, a tube is obtained which has a considerably lower weight but substantially unchanged ring strength as compared with a conventional spiral-wound tube of the same diameter and material thickness.

On the contrary, if it is desirable to improve the ring strength of the tube remarkably, whereas the weight of the tube is of secondary significance, the modified polymer may appropriately consist of a polymer filled with minerals. In this way it is possible to improve the mechanical properties of the spiral-wound tube considerably without increased material cost.

As the outer layer, it is appropriately possible to use UV-stabilized polyethylene, polypropylene, polyvinylchloride, or polycarbonate.

The best result is obtained if the hollow section 1 has a substantially rectangular cross-section, whereby the extruder welding can be carried out by means of two extruder nozzles, one at the outer mantle of the tube and one at its inner mantle. The preheating of the side faces of the hollow section that are to be welded together takes place appropriately by means of, for example, an electrically heated heating body or by means of blowing of warm air. The hollow profile 1 is spiral-wound around a relatively short mandrel, whose movement of rotation takes care of the forward feeding of the hollow section. The shifting of the ready-welded tube in the axial direction is taken care of by rollers, which are freely rotatable around stationary shafts directed radially to the main axis of the mandrel. As a result of the fact that the tube reaches its full strength as soon as the weld joint 5 has cooled, just a very short mandrel is required.

By arranging the extrusion of the hollow section 1 so that the outer layer 2 at one side, i.e. the side that forms the inside face in the finished spiral-wound tube, consists of a polymer resistant to chemicals, a spiral-wound tube of very high-class properties is obtained at reasonable cost of manufacture.

The manufacture of the spiral-wound tube in accordance with the invention can be arranged either so that the coextruded hollow section 1 is passed from the extruder nozzle through a cooling zone directly into the machine in which the spiral winding and the extruder welding take place, or the hollow section 1 is gathered in large rolls for intermediate storage before the hollow section 1 is fed into the line for the manufacture of the spiral-wound tube.

I claim:

1. Plastic tube formed by spiral winding of a coextruded hollow section joined together by extruder welding or gluing, the hollow section comprising a first hollow section outer layer of a plastic material with a homogeneous surface and with good weldability, a second hollow section intermediate layer of modified polymer material, said intermediate layer being surrounded by and concentric with said outer layer and a third hollow section inner layer of a plastic material with homogenous surface, said inner layer being surrounded by and concentric with said intermediate layer.

2. Plastic tube as claimed in claim 1, wherein the outer layer consists of UV-stabilized polyethylene, polypropylene, polyvinylchloride, or polycarbonate.

3. Plastic tube as claimed in claim 2, wherein the coextruded hollow section has a substantially rectangular cross-section.

4. Plastic tube as claimed in claim 3, wherein the outer layer at the side wall of the first hollow section that forms the inner face in the spiral-wound tube consists of a polymer resistant to chemicals.

5. Plastic tube as claimed in claim 1, wherein the modified polymer is foamed.

6. Plastic tube as claimed in claim 1, wherein the modified polymer consists of a polymer filled with minerals.

7. A plastic tube formed by spiral winding of a coextruded hollow tubular section joined together by extruder welding or gluing, the hollow tubular section comprising:

- an inner tubular layer having an inner face surrounding a hollow space, said inner layer being formed of a plastic with a homogenous surface;
- an intermediate tubular layer of modified polymer, disposed around and concentric with said inner layer; and
- an outer tubular layer of plastic with a homogenous surface and with good weldability, said outer layer being provided around and concentric with said intermediate layer.

* * * * *